2 Sheets—Sheet 1.
R. McBEE.
Stench-Trap Connection.
No. 213,831. Patented April 1, 1879.
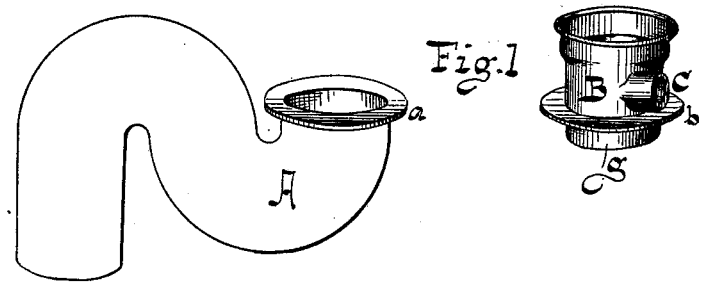
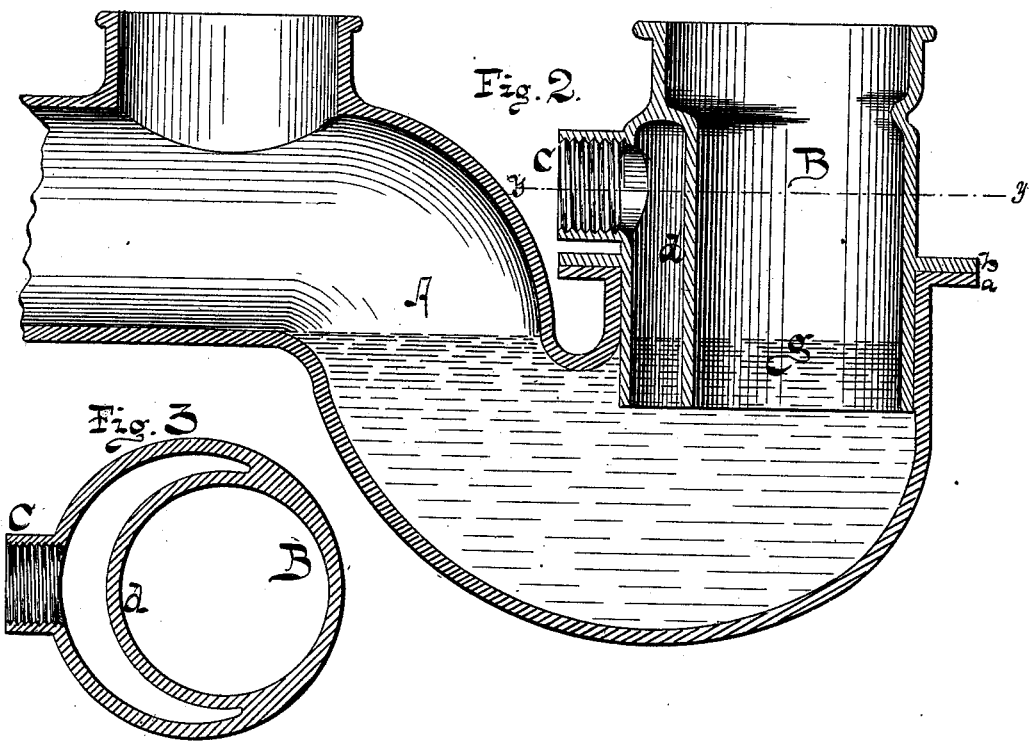
Witnesses.
L. Marshall
Aug. Jordan
Inventor:
Randolph McBee
By his Atty
R.D.O. Smith 2 Sheets—Sheet 2.
R. McBEE.
Stench-Trap Connection.
No. 213,831. Patented April 1, 1879.
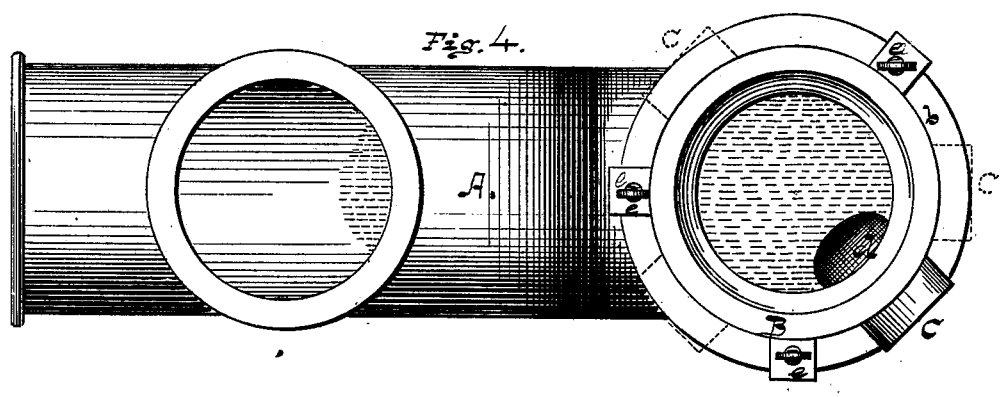
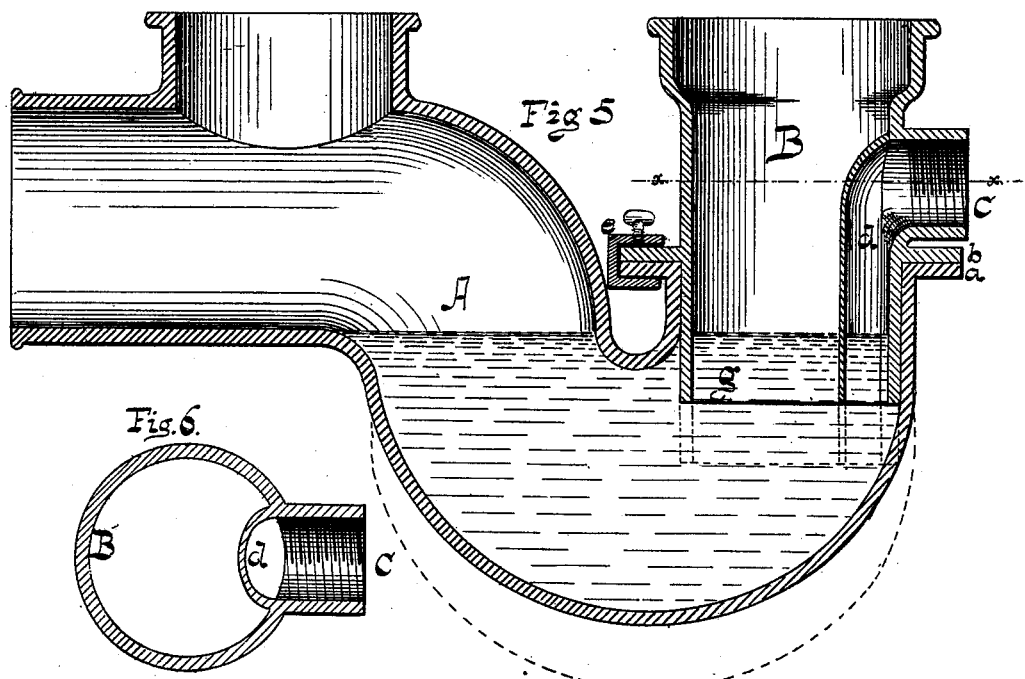
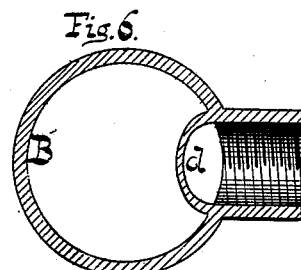
Witnesses.
L. Marshall
Aug. Jordan
Inventor:
Randolph McBee
By his Atty.
R. D. Smith

UNITED STATES PATENT OFFICE.

RANDOLPH McBEE, OF WASHINGTON, DISTRICT OF COLUMBIA.

IMPROVEMENT IN STENCH-TRAP CONNECTIONS.

Specification forming part of Letters Patent No. 213,831, dated April 1, 1879; application filed February 27, 1879.

*To all whom it may concern:*

Be it known that I, RANDOLPH McBEE, of the city of Washington, in the District of Columbia, have invented a new and useful Improvement in Stench-Trap Connections; and that the following is a full and complete description thereof.

In setting stationary wash-stands and bath-tubs, it is a common practice to discharge the waste-pipes from the same into the water-closet trap, if there is one near. In this way the single water-seal in said trap is made to do duty for all the waste-pipes so entering said trap. Sometimes the water-closet trap is tapped, and the waste-pipe connected at the lower bend below the water-line. This practice is objectionable, because it is extremely difficult to make the opening exactly in line with the direction from which the waste-pipe must come, and it is also difficult to make a secure and tight joint in the thin iron of the trap. An additional objection is the liability that sediment in the trap will clog the waste-pipe outlet. Therefore good workmen more frequently tap the water-closet trap above the water-line, where there is little or no danger of leakage from a defective joint, and no liability to be clogged by matter received from the trap. Whichever method or practice may be pursued, it is extremely difficult to set the parts so that the tap-hole will come exactly in line with the direction from which the waste-pipe must come, and one of two things necessarily follows: first, the joint will be a poor one and liable to leak, or, second, it will be necessary to bend the waste-pipe. The first, of course, will not be tolerated by a good workman, and the last is very difficult to accomplish and still secure a good joint.

The end of the waste-pipe also commonly protrudes into the trap, and forms a permanent obstruction to the passage of undissolved matter.

To obviate these difficulties, I make the inlet end of my trap shorter than usual, and add to the shortened end of the trap a fitting or cap that may be freely rotated therein for adjustment, and then be securely fastened.

The inlet or tap for the waste-pipe is made in the side of this cap, and it may be adjusted easily and accurately to any direction necessary, so that a waste-pipe may be inserted with as little risk of a leaky joint as in any ordinary pipe-fitting, and with no trouble as to direction whatever.

That others may more fully understand my invention, I will particularly describe it, having reference to the accompanying drawings, wherein—

Figure 1 represents, in perspective, the parts of my trap separated. Fig. 2 is a vertical longitudinal section of the same. Fig. 3 is a transverse section of the same on line $y\ y$. Fig. 4 is a plan view of the trap. Fig. 5 is a longitudinal section, showing a modification in structure. Fig. 6 is a longitudinal section on line $x\ x$.

A is the trap, which may be in general form like any common trap, except that its inlet or bell end is made shorter than usual; and instead of the ordinary bell it may be terminated by a laterally-projecting flange, $a$, or other convenient device for attaching the cap B, which is provided with an ordinary bell, and with a flange, $b$. It is also provided with a short lateral branch, $c$, which may be tapped or otherwise adapted to receive and securely hold the discharge end of a bath-tub or basin waste-pipe.

The branch C may discharge directly into the cap B, or it may be provided with a hood, $d$, within said cap, and extending to the lower edge thereof, so as to make the final outlet of the waste-pipe internal as to the trap, and below the water-line thereof.

The external form of the hood B is cylindrical, so that it will fit the inlet end of the trap A, and so that it may be turned around therein to adjust the branch $c$ to any angle desired.

The cap B may also have a neck, $g$, below the flange $b$, which neck, when present, is extended downward as far below the water-line as desired. The distance through which it extends below the water is the measure of the water-seal. In water-closet traps the water-seal varies from one to two inches. The lower bend of the trap is made more or less deep, according to the length of the neck $g$ and the desired depth of the water-seal. This is clearly shown in dotted lines in Fig. 5.

The angular adjustment of the neck C to receive the waste-pipe from whatever direction is clearly shown by dotted lines in Fig. 4.

The flanges $a$ and $b$ may be secured together by screws, clamps $c$, as shown in Figs. 4 and 5, or in any suitable way.

In practice this device, aside from the security which its use affords, as above stated, adds greatly to the convenience of the workman in many cases where the position of the trap renders it difficult to reach the fittings, because the waste-pipe may be inserted and the joint made good before the cap B is put in place upon the trap.

Having described my invention, what I claim as new is—

1. A trap, A, preferably made shorter than common on the inlet side, combined with an adjustable cap, B, provided with a lateral branch, C, to receive the end of a tub or basin waste-pipe, as set forth.

2. A trap, A, preferably made shorter than common on the inlet side, combined with an adjustable cap, B, provided with a lateral branch, C, and an interior hood, $d$, to cover said discharge-inlet, and cause it to be covered by the water-seal in the trap.

3. A trap, A, preferably made shorter than common on the inlet side, combined with an adjustable cap, B, provided with a lateral branch, C, and a neck, $g$, which extends downward below the water-line and determines the depth of water-seal, as set forth.

RANDOLPH McBEE.

Witnesses:
R. D. O. SMITH,
L. MARSHALL.